United States Patent
Chou

(10) Patent No.: US 9,722,834 B2
(45) Date of Patent: Aug. 1, 2017

(54) COMMUNICATION SYSTEM AND PHASE ERROR ESTIMATING METHOD THEREOF

(71) Applicant: MStar Semiconductor, Inc., Hsinchu Hsien (TW)

(72) Inventor: Yu-Jen Chou, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/989,908

(22) Filed: Jan. 7, 2016

(65) Prior Publication Data

US 2016/0218858 A1 Jul. 28, 2016

(30) Foreign Application Priority Data

Jan. 28, 2015 (TW) .............................. 104102810 A

(51) Int. Cl.
*H04L 27/26* (2006.01)
*H04L 27/00* (2006.01)
*H04L 27/227* (2006.01)

(52) U.S. Cl.
CPC .......... *H04L 27/26* (2013.01); *H04L 27/0014* (2013.01); *H04L 27/2276* (2013.01); *H04L 2027/0067* (2013.01)

(58) Field of Classification Search
CPC .................................................. H04L 7/0054
See application file for complete search history.

(56) References Cited

U.S. PATENT DOCUMENTS

| | | | | |
|---|---|---|---|---|
| 4,566,330 A * | 1/1986 | Fujii | ...................... | G01N 29/11 73/1.79 |
| 6,201,954 B1 * | 3/2001 | Soliman | ............... | H04B 17/318 370/332 |
| 6,560,294 B1 * | 5/2003 | Gatherer | ............. | H04L 27/3872 348/725 |
| 6,874,006 B1 * | 3/2005 | Fu | .......................... | H04L 27/22 708/442 |
| 7,627,067 B2 * | 12/2009 | Coulson | .............. | H04L 27/2656 375/260 |
| 8,588,356 B2 | 11/2013 | Meyer | | |
| 2016/0124811 A1 * | 5/2016 | Musha | ............. | G11B 20/10222 714/771 |

OTHER PUBLICATIONS

TIPO Office Action, Jul. 21, 2016, 4 pages.

\* cited by examiner

*Primary Examiner* — Kenneth Lam
(74) *Attorney, Agent, or Firm* — Edell, Shapiro & Finnan, LLC

(57) ABSTRACT

A communication system includes a receiving circuit and a phase error estimating circuit. The receiving circuit receives an input signal x, which has an input phase θ in a polar coordinate system. According to partial differentiation performed on the natural logarithm of a function f(x, θ), the phase error estimating circuit generates an estimated phase error of the input signal x. f(x, θ) represents a probability function of receiving the input signal x at the receiving circuit.

10 Claims, 2 Drawing Sheets

//tex2jax_ignore
COMMUNICATION SYSTEM AND PHASE ERROR ESTIMATING METHOD THEREOF This application claims the benefit of Taiwan application Serial No. 104102810, filed Jan. 28, 2015, the subject matter of which is incorporated herein by reference.

BACKGROUND OF THE INVENTION

Field of the Invention

The invention relates in general to a communication system, and more particularly to a phase error estimating technology in a communication system.

Description of the Related Art

Various types of communication apparatuses are becoming more and more popular as electronics-related technologies continue to progress. There are currently many digital communication systems that adopt coherent demodulation technologies, e.g., Digital Video Broadcasting-Satellite-Second Generation (DVB-S2) systems. As a receiving end of such type of system needs to accurately estimate the value of phase error in a received signal, phase error estimation based on additive white Gaussian noise (AWGN) models is a highly valued and extensively researched subject in the field of signal processing. In current techniques, phase error detectors (PEDs) for tracking phase changes at a receiver may be divided into several main categories, including non-data aided (NDA), decision directed (DD) and soft decision directed (SDD).

SUMMARY OF THE INVENTION

The invention is directed to a communication system and a phase error estimating method thereof capable of satisfying a Cramer-Rao bound (CRB) rule, i.e., minimizing a difference between an estimated phase error and a real phase error of a receiving end. The concept of the present invention is applicable to various types of communication systems.

A communication system is provided according to an embodiment of the present invention. The communication system includes a receiving circuit and a phase error estimating circuit. The receiving circuit receives an input signal x, which has an input phase $\theta$ in a polar coordinate system. f(x, $\theta$) represents a probability function of receiving the input signal x at the receiving circuit. According to an equation below, the phase error estimating circuit generates an estimated phase error $\hat{\theta}$ of the input signal x:

$$\hat{\theta} = \frac{\partial}{\partial \theta} \ln f(x, \theta).$$

A communication system is provided according to another embodiment of the present invention. The communication system includes a receiving circuit and a phase error estimating circuit. The receiving circuit receives an input signal, which corresponds to an output signal that a transmitting end generates based on M-phase shift keying (M-PSK), where M is a value of 2 raised to a power of any positive integer. The input signal has an input signal radius r and an input phase $\theta$ in a polar coordinate system. The phase error estimating circuit generates a first harmonic coefficient $h_1(r)$ and a second harmonic coefficient $h_2(r)$ according to the input signal radius r, and generates a first sine function $\sin(M\theta)$ and a second sine function $\sin(2M\theta)$ according to the input phase $\theta$. The phase error estimating circuit then multiplies the first harmonic coefficient $h_1(r)$ by the first sine function $\sin(M\theta)$ to generate a first operation result, and multiplies the second harmonic coefficient $h_2(r)$ by the second sine function $\sin(2M\theta)$ to generate a second operation result. According to the first operation result and the second operation result, the phase error estimating circuit generates an estimated phase error $\hat{\theta}$ of the input signal.

A phase error estimating method applied to a communication system is provided according to another embodiment of the present invention. The phase error estimating method, for estimating a phase error of an input signal x, includes following steps. A determination step is first performed to determine an input phase $\theta$ of the input signal x in a polar coordinate system. f(x, $\theta$) represents a probability function of receiving the input signal x. An estimated phase error is then generated according to an equation below:

$$\hat{\theta} = \frac{\partial}{\partial \theta} \ln f(x, \theta).$$

A phase error estimating method applied to a communication system is further provided according to yet another embodiment of the present invention. The phase error estimating method is for estimating a phase error of an input signal x. The input signal x corresponds to an input signal corresponds to an output signal that a transmitting end generates based on M-phase shift keying (M-PSK), where M is a value of 2 raised to a power of any positive integer. A determination step of the phase error estimating method is first performed to determine an input signal radius r and an input phase $\theta$ of the input signal x in a polar coordinate system. A first harmonic coefficient $h_1(r)$ and a second harmonic coefficient $h_2(r)$ are generated according to the input signal radius r. A first sine function $\sin(M\theta)$ and a second sine function $\sin(2M\theta)$ are generated according to the input phase $\theta$. The first harmonic coefficient $h_1(r)$ is multiplied by the first sine function $\sin(M\theta)$ to generate a first operation result, and the second harmonic coefficient $h_2(r)$ is multiplied by the second sine function $\sin(2M\theta)$ to generate a second operation result. According to the first operation result and the second operation result, an estimated phase error $\hat{\theta}$ of the input signal is generated.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1A:
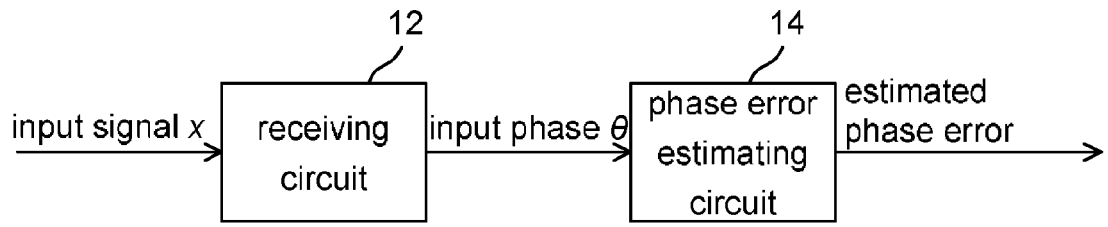
FIG. 1(A) and FIG. 1(B) are functional block diagrams of a communication system according to an embodiment of the present invention.

The mathematical expressions in the disclosure are for illustrating principles and logics associated with the embodiments. Unless otherwise specified, these mathematical expressions do not form limitations upon the scope of the present invention. One person skilled in the art can understand that, there are many technologies capable of realizing physical expressions and forms corresponding to these mathematical expressions.

Details of how a communication system and a phase error estimating method of the present invention provide an estimated phase error that satisfies a Cramer-Rao bound (CRB) rule are given below.

It is assumed that a receiving end of a communication system receives an input signal x, which has an input phase $\theta$ when the input signal x is expressed by a polar coordinate system. An observable $S(x)$ is defined as an unbiased estimator of the input phase $\theta$, and an expected value of the observable $S(x)$ is:

$$E[S(x)] = \int S(x) \cdot f(x,\theta) dx = \theta \quad \text{equation (1)}$$

In equation (1), $f(x, \theta)$ represents a probability function of the input signal x.

An estimated difference $\epsilon(x)$ between the estimated phase error generated by the receiving end of the communication system and the real phase error is:

$$\epsilon(x) = S(x) - \theta_{act} \quad \text{equation (2)}$$

In equation (2), $\theta_{act}$ represents the real phase error of the input signal x. The main goal of the communication system and the phase error estimating method of the present invention is to render a variance of the estimated difference $\epsilon(x)$ to have a predetermined lower limit. Further, based on the assumption of an unbiased phase, an expected value of the estimated difference $\epsilon(x)$ is zero:

$$E[\epsilon(x)] = \int [S(x) - \theta_{act}] \cdot f(x,\theta) dx = 0 \quad \text{equation (3)}$$

In a regularity condition, $$\frac{\partial}{\partial \theta} \int = \int \frac{\partial}{\partial \theta}.$$

By performing partial differentiation on the expected value $E[\epsilon(x)]$, an equation below is obtained:

$$\frac{\partial}{\partial \theta} E[\epsilon(x)] = \frac{\partial}{\partial \theta} \int [S(x) - \theta_{act}] \cdot f(x,\theta) dx = 0 \quad \text{equation (4)}$$

$$= \int [S(x) - \theta_{act}] \cdot \frac{\partial}{\partial \theta} f(x,\theta) dx +$$

$$\int \frac{\partial}{\partial \theta} [S(x) - \theta_{act}] \cdot f(x,\theta) dx$$

$$= \int \epsilon(x) \cdot v(\theta, x) \cdot f(x,\theta) dx - \int f(x,\theta) dx = 0$$

In the above, $\int f(x, \theta) dx$ is equal to 1, and so $\int \epsilon(x) \cdot v(\theta, x) \cdot f(x, \theta) dx = 1$.

By using mathematical equations:

$$v(\theta, x) = \frac{\partial}{\partial \theta} \ln f(x, \theta) \quad \text{equation (5)}$$

$$E[v(\theta, x)] = 0 \quad \text{equation (6)}$$

It is obtained that a covariance of the estimated difference $\epsilon(x)$ and $v(\theta, x)$ is equal to 1.

$$E[\epsilon(x) \cdot v(\theta,x)] = E[S(x) \cdot v(\theta,x)] - \theta_{act} E[v(\theta,x)] = E[S(x) \cdot v(\theta,x)] = 1 \quad \text{equation (7)}$$

Next, by using a mathematical equation "$1 \leq \text{StDev}(\Sigma) \times \text{StDev}(v)$", when a correlation coefficient between the estimated difference $\epsilon(x)$ and $v(\theta, x)$ is $\leq 1$, an equation defined by CRB rule is as below:

$$E[\epsilon(x) \cdot v(\theta, x)]^2 = 1 \leq E[\epsilon^2(x)] \cdot E[v^2(\theta, x)] \quad \text{equation (8)}$$

$$E[\epsilon^2(x)] \geq \frac{1}{E[v^2(\theta, x)]} \quad \text{equation (9)}$$

It is known from the above equations that, given the estimated difference estimated difference $\epsilon(x)$ is correlated with $v(\theta, x)$, the above condition that satisfies the CRB rule can be established. Therefore, in the communication system and the phase error estimating method of the present invention, $v(\theta, x)$ is utilized to estimate the estimated difference $\epsilon(x)$, so as to provide an estimated phase error that satisfies the CRB rule.

FIG. 1(A) shows a functional block diagram of a communication system according to an embodiment of the present invention. A communication system 100 includes a receiving circuit 12 and a phase error estimating circuit 14. The receiving circuit 12 receives an input signal x, which may be converted and represented by an input radius r and an input phase $\theta$ in a polar coordinate system. $f(x, \theta)$ represents a probability function of receiving the input signal x at the receiving circuit. According to an equation below, the phase error estimating circuit 14 generates an estimated phase error $\hat{\theta}$ of the input signal x:

$$\hat{\theta} = \frac{\partial}{\partial \theta} \ln f(x, \theta) \quad \text{equation (10)}$$

It should be noted that, the scope of the present invention does not limit a particular configuration or structure for realizing the communication system 100, and the setting of the probability function $f(x, \theta)$ may be determined by a circuit designer according to characteristics of an actual signal and the transmission environment. In practice, after the probability function $f(x, \theta)$ is determined, equation (10) may be expanded into an equation of other forms to be further appropriately simplified. On the other hand, the error phase estimating circuit 14 that calculates the estimated phase error $\hat{\theta}$ may be implemented as a fixed and/or programmable digital logic circuit, including a programmable logic gate array, an application specific integrated circuit (ASIC), a microcontroller, a microprocessor, a digital signal processor (DSP), or other necessary circuits. Alternatively, the phase error estimating circuit 14 may be designed to complete various tasks through executing processor commands stored in a memory (not shown).

A communication system based on M-phase shift keying (M-PSK) is taken as an example in the description below (where M is a value of 2 raised to a power of a positive integer, e.g., 2, 4, 8, 16 . . . ). Without considering shifts of the signal in the frequency and time domains, the signal received by the receiving circuit 12 may be represented as:

$$x[k] = a[k]e^{j\theta} + w[k], \ k=0,1,\ldots,(L_0-1) \quad \text{equation (11)}$$

In equation (11), $L_0$ represents the number of sampling points on the time axis, a[k] represents an ideal signal provided by the transmitting end, r[k] represents the signal received by the receiving circuit 12, and w[k] represents additive white Gaussian noise (AWGN). An angle $\theta$ of the signal x[k] in the polar coordinate system is an unknown value to be determined. Corresponding to the probability function f(x[0]|a[0];θ]) of the signal x[0] may be defined as:

$$f(x[0] \mid a[0]; \theta) = \frac{1}{\sqrt{2\pi\sigma^2}} \exp\left\{\frac{-\|x[0] - a[0]e^{j\theta}\|^2}{2\sigma^2}\right\} \quad \text{equation (12)}$$

In equation (12), the symbol σ represents a standard deviation.

Equation (12) may be re-written as:

$$f(x[0]; \theta) = f(x[0] \mid a_0[0])p(a_0[0]) + \ldots = \quad \text{equation (13)}$$

$$\frac{1}{M\sqrt{2\pi\sigma^2}} \sum_{k=0}^{M-1} \exp\left\{\frac{-\|x[0] - a_k[0]e^{j\theta}\|^2}{2\sigma^2}\right\}$$

In equation (13), $a_k[0]$ is defined as:

$$\quad \text{equation (14)}$$

$$a_k[0] = \sqrt{\frac{B_s}{N_0}} e^{\frac{j2\pi k}{M}}$$

$$= ae^{\frac{j2\pi k}{M}}$$

$$= \frac{1}{M\sqrt{2\pi\sigma^2}} \sum_{k=0}^{M-1} \exp\left\{\frac{-1}{2\sigma^2}\begin{pmatrix}|x[0]|^2 + |a_k[0]|^2 - \\ 2\text{Re}\{x[0]\cdot a_k^*[0]\cdot e^{-j\theta}\}\end{pmatrix}\right\}$$

$$= T' \cdot \sum_{k=0}^{M-1} \exp\left\{\frac{2}{N_o}\text{Re}\left\{a\cdot x[0]\cdot e^{\frac{-j2\pi k}{M}\cdot e^{-j\theta}}\right\}\right\}$$

In equation (14), the symbol T' represents:

$$T' = \frac{1}{M\sqrt{2\pi\sigma^2}} \exp\left\{\frac{-1}{2\sigma^2}(|x[0]|^2 + |a|^2)\right\} \quad \text{equation (15)}$$

A result of performing a natural logarithm operation on equation (13) is:

$$\ln f(x[0]; \theta) = \quad \text{equation (16)}$$

$$\ln T' + \ln\left\{\sum_{k=0}^{\frac{M}{2}-1} \cosh\left(\frac{2}{N_0}\text{Re}\{a\cdot x[0]\cdot e^{+j2\pi k/M}\cdot e^{-j\theta}\}\right)\right\}$$

In equation (16), ln f(x[0], θ]) is ln f(x, θ) in equation (10). Thus, the estimated phase error $\hat{\theta}$ may be obtained by performing partial differentiation on equation (16):

$$\quad \text{equation (17)}$$

$$\hat{\theta} = \frac{\partial}{\partial \theta} \ln f(x[0]; \theta) =$$

$$\frac{2}{N_0} \frac{\sum_{k=0}^{\frac{M}{2}-1} \sinh\left(\frac{2}{N_0}\text{Re}\left\{\begin{array}{c}a\cdot x[0]\cdot \\ e^{+j2\pi k/M}\cdot e^{-j\theta}\end{array}\right\}\right) \cdot \text{Im}\left\{\begin{array}{c}a\cdot x[0]\cdot \\ e^{+j2\pi k/M}\cdot e^{-j\theta}\end{array}\right\}}{\sum_{k=0}^{\frac{M}{2}-1} \cosh\left(\frac{2}{N_0}\text{Re}\{a\cdot x[0]\cdot e^{+j2\pi k/M}\cdot e^{-j\theta}\}\right)}$$

In practice, simulation software such as Malab® may be utilized to simplify the complexity of actual circuits to further represent equation (17) by a Fourier series, and harmonic items with lower contribution in the calculation of the estimated phase error $\hat{\theta}$ are omitted. In one embodiment, only the first harmonic item and the second harmonic item are taken into consideration. Equation (17) is simplified as:

$$\hat{\theta} = h_1(r)\sin(M\theta) - h_2(r)\sin(2M\theta) \quad \text{equation (18)}$$

In equation (18), the first harmonic coefficient $h_1(r)$ and the second harmonic coefficient $h_2(r)$ are associated with the signal input radius r of the input signal x in the polar coordinate system, and the first sine function sin(Mθ) and the second sine function sin(2Mθ) are associated with the input phase θ of the input signal x in the polar coordinate system. In other words, after the signal radius r and the input phase θ of the input signal x in the polar coordinate system are determined, the phase error estimating circuit 14 may generate the first harmonic coefficient $h_1(r)$ and the second harmonic coefficient $h_2(r)$ according to the input signal radius r, and generate the first sine function sin(Mθ) and the second sine function sin(2Mθ) according to the input phase θ. Next, the phase error estimating circuit 14 may multiply the first harmonic coefficient $h_1(r)$ by the first sine function sin(Mθ) to generate a first operation result, and multiply the second harmonic coefficient $h_2(r)$ by the second sine function sin(2Mθ) to generate a second operation result. According to the first operation result and the second operation result, the phase error estimating circuit 14 may generate the estimate phase error $\hat{\theta}$ of the input signal x.

Figure 1B:
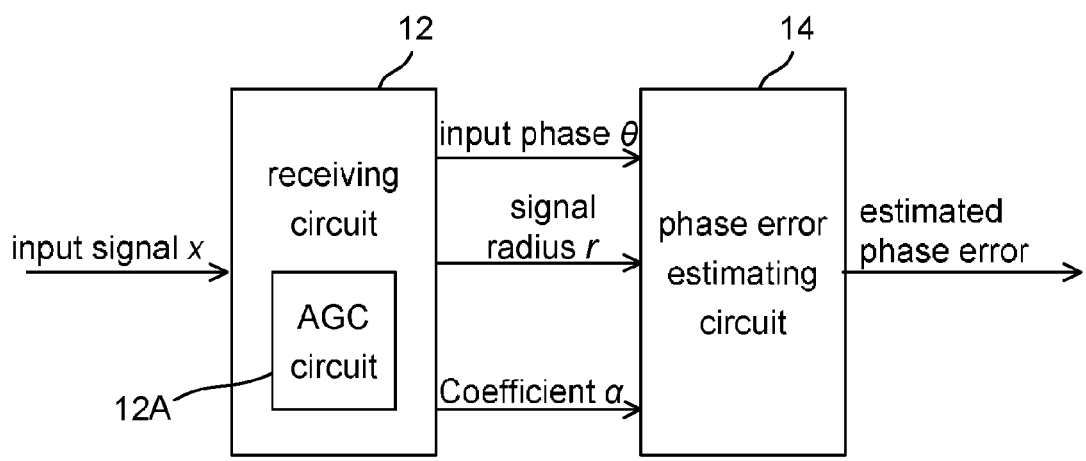

As shown in FIG. 1(B), the receiving circuit 12 may further include an auto gain control (AGC) circuit 12A. Before the phase error estimating circuit 14 generates the first harmonic coefficient $h_1(r)$ and the second harmonic coefficient $h_2(r)$, the AGC circuit 12A adjusts the input signal x such that the input signal x has a signal strength $\alpha^2$, where α represents a normalization factor. In one embodiment, the phase error estimating circuit 14 also considers the normalization factor α when generating the first harmonic coefficient $h_1(r)$ and the second harmonic coefficient $h_2(r)$, and generates the first harmonic coefficient $h_1(r)$ and the second harmonic coefficient $h_2(r)$ according to equations below:

$$h_1(r) = \begin{cases} 0, & r < d_1\alpha \\ d_2 + \frac{d_3}{\alpha}(r - d_4\alpha), & r \geq d_5\alpha \\ \frac{d_6}{2\alpha}(r - d_7\alpha), & \text{else} \end{cases} \quad \text{equation (19)}$$

$$h_2(r) = \begin{cases} 0, & r < d_8\alpha \\ \frac{d_9}{\alpha}(r - d_{10}\alpha), & r \geq d_8\alpha \end{cases} \quad \text{equation (20)}$$

In equations (19) and 20, each of $d_1$ to $d_{10}$ represents a constant value. For example, when the value M is equal to 8 (i.e., the communication system 100 adopts a 8PSK modulated operation), and a symbol energy/noise density ratio (Es/No) equal to 5.6 dB is substituted into equation (17), following equations are obtained:

$$h_1(r) = \begin{cases} 0, & r < 1.357488\alpha \\ 3.164957 + \dfrac{6.208301}{\alpha}(r - 2.377077\alpha), & r \geq 2.377077\alpha \\ \dfrac{6.208301}{2\alpha}(r - 1.357488\alpha), & \text{else} \end{cases} \quad \text{equation (21)}$$

$$h_2(r) = \begin{cases} 0, & r < 2.546168\alpha \\ \dfrac{0.966715}{\alpha}(r - 2.546168\alpha), & r \geq 2.546168\alpha \end{cases} \quad \text{equation (22)}$$

It should be noted that, the actual values of the first harmonic coefficient $h_1(r)$ and the second harmonic coefficient $h_2(r)$ are associated with the parameters in equation (17) as well as the method by which equation (17) is simplified, and are not limited to particular values. Details of ACG technologies and a method for selecting the normalization factor $\alpha$ are known to one person skilled in the art, and shall be omitted herein.

A phase error estimating method for a communication system is provided according to another embodiment of the present invention to estimate a phase error of an input signal x. The phase error estimating method first performs a determining step to determine an input phase $\theta$ of the input signal x in a polar coordinate system. $f(x, \theta)$ represents a probability function of receiving the input signal x. An estimated phase error $\hat{\theta}$ of the input signal x is then generated according to an equation:

$$\hat{\theta} = \frac{\partial}{\partial \theta} \ln f(x, \theta).$$

Figure 2:
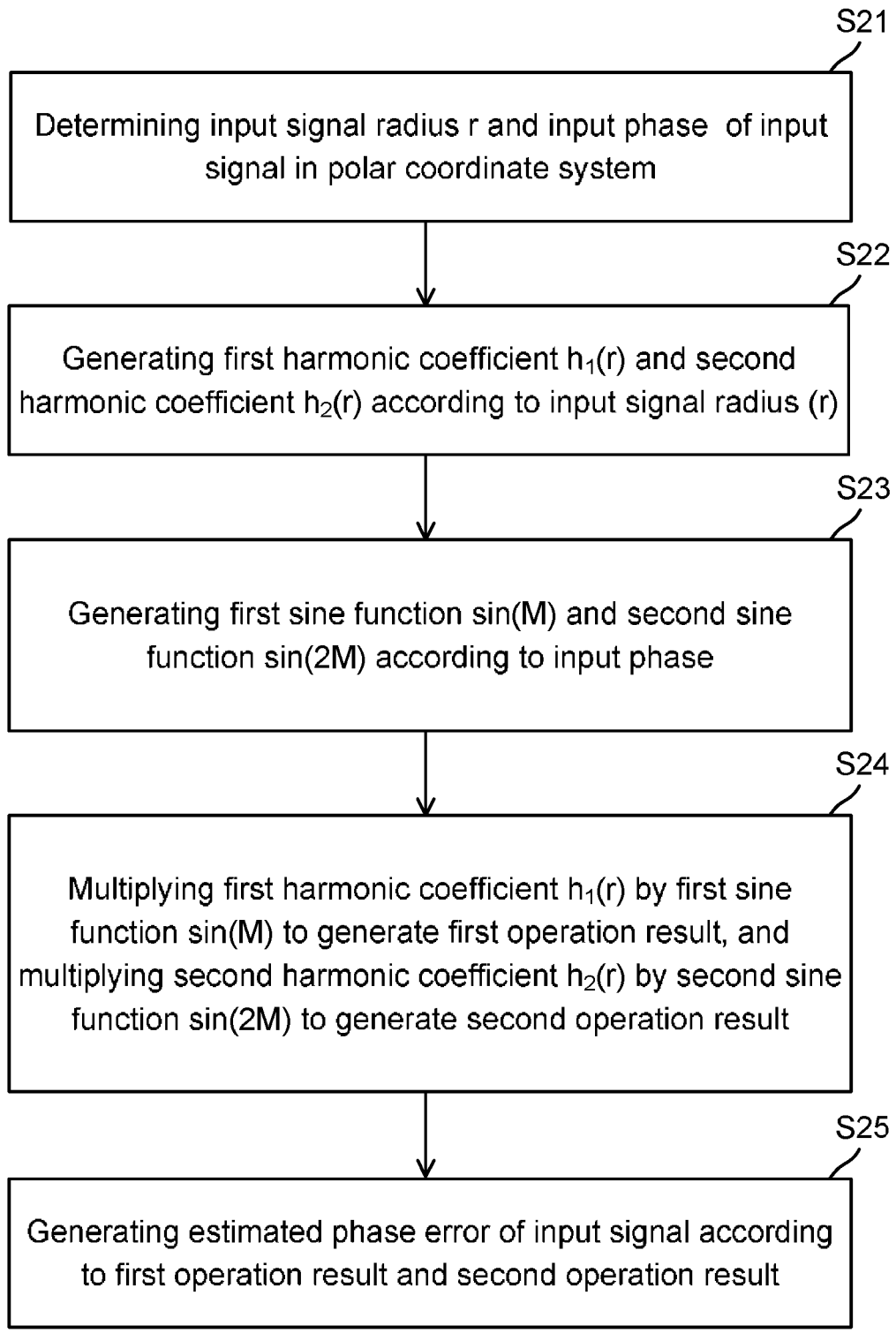
FIG. 2 is a flowchart of a phase error estimating method according to an embodiment of the present invention.

A phase error estimating method for a communication system is provided according to another embodiment of the present invention to estimate a phase error of an input signal x. FIG. 2 shows a flowchart of the phase error estimating method. The input signal x corresponds to an output signal that a transmitting end generates based on M-PSK, where M is a value of 2 raised to a power of any positive integer. In step S21, the phase error estimating method performs a determining step to determine an input signal radius r and an input phase $\theta$ of the input signal x in a polar coordinate system. In step S22, a first harmonic coefficient $h_1(r)$ and a second harmonic coefficient $h_2(r)$ are generated according to the input signal radius r. In step S23, a first sine function $\sin(M\theta)$ and a second sine function $\sin(2M\theta)$ are generated according to the input phase $\theta$. In step S24, the first harmonic coefficient $h_1(r)$ is multiplied by the first sine function $\sin(M\theta)$ to generate a first operation result, and the second harmonic coefficient $h_2(r)$ is multiplied by the second sine function $\sin(2M\theta)$ to generate a second operation result. In step S25, an estimated phase error $\hat{\theta}$ of the input signal is generated according to the first operation result and the second operation result.

One person skilled in the art can understand that, in FIG. 2, the sequences of certain steps may be equivalently exchanged without affecting the overall effect of the phase error estimating method. Further, operation variations in the description associated with the communication system 100 are applicable to the phase error estimating method, and shall be omitted herein.

It should be noted that, the drawings of the present invention include functional block diagrams of multiple functional circuits related to one another. These drawings are not detailed circuit diagrams, and connection lines therein are for indicating signal flows only. The interactions between the functional elements/or processes are not necessarily achieved through direct electrical connections. Further, functions of the individual elements are not necessarily distributed as depicted in the drawings, and separate blocks are not necessarily implemented by separate electronic elements.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A communication system for estimating a phase error, comprising:
a receiving circuit, that receives an input signal x, the input signal x having an input signal radius r and an input phase $\theta$, wherein the input signal x is generated based on M-phase shift keying (M-PSK); and
an error estimating circuit, that generates a first harmonic coefficient $h_1(r)$ and a second harmonic coefficient $h_2(r)$ according to the input signal radius r, generates a first sine function $\sin(M\theta)$ and a second sine function $\sin(2M\theta)$ according to the input phase $\theta$, multiplies the first harmonic coefficient $h_1(r)$ by the first sine function $\sin(M\theta)$ to generate a first operation result and multiplies the second harmonic coefficient $h_2(r)$ by the second sine function $\sin(2M\theta)$ to generate a second operation result, and generates an estimated phase error $\hat{\theta}$ according to the first operation result and the second operation result;
wherein, the estimated phase error $\hat{\theta}$ is associated with a Fourier series of $$\frac{\partial}{\partial \theta} \ln f(x, \theta),$$

and $f(x, \theta)$ represents a probability function of receiving the input signal x at the receiving circuit, and
wherein the estimated phase error $\hat{\theta}$ is used to compensate a phase of the input signal x.

2. The communication system according to claim 1, wherein the receiving circuit further comprises:
an auto gain control (AGC) circuit, that adjusts a signal strength $\alpha^2$ of the input signal, where $\alpha$ represents a normalization factor;
wherein, the first harmonic coefficient $h_1(r)$ and the second harmonic coefficient $h_2(r)$ are associated with the normalization factor $\alpha$.

3. The communication system according to claim 2, wherein the phase error estimating circuit generates the first harmonic coefficient $h_1(r)$ according to an equation:

$$h_1(r) = \begin{cases} 0, & r < d_1\alpha \\ d_2 + \dfrac{d_3}{\alpha}(r - d_4\alpha), & r \geq d_5\alpha \\ \dfrac{d_6}{2\alpha}(r - d_7\alpha), & \text{else} \end{cases};$$

wherein, each of $d_1$ to $d_7$ represents a constant value.

4. The communication system according to claim 2, wherein the phase error estimating circuit generates the second harmonic coefficient $h_2(r)$ according to an equation:

$$h_2(r) = \begin{cases} 0, & r < d_8\alpha \\ \dfrac{d_9}{\alpha}(r - d_{10}\alpha), & r \geq d_8\alpha \end{cases};$$

wherein, each of $d_8$ to $d_{10}$ represents a constant value.

5. The communication system according to claim 2, wherein the phase estimating circuit generates the estimated phase error $\hat{\theta}$ according to an equation:

$\hat{\theta} = h_1(r)\sin(M\theta) - h_2(r)\sin(2M\theta)$.

6. A phase error estimating method applied to a communication system to estimate a phase error of an input signal x, the input signal x corresponding to an output signal that a transmitting end generates based on M-PSK, M being a value of 2 raised to a power of any positive integer, the phase error estimating method comprising:
  a) receiving an input signal x, the input signal x having an input signal radius r and an input phase $\theta$, wherein the input signal x is generated based on M-phase shift keying (M-PSK);
  b) generating a first harmonic coefficient $h_1(r)$ and a second harmonic coefficient $h_2(r)$ according to the input signal radius r;
  c) generating a first sine function $\sin(M\theta)$ and a second sine function $\sin(2M\theta)$ according to the input phase $\theta$;
  d) multiplying the first harmonic coefficient $h_1(r)$ by the first sine function $\sin(M\theta)$ to generate a first operation result, and multiplying the second harmonic coefficient $h_2(r)$ by the second sine function $\sin(2M\theta)$ to generate a second operation result; and
  e) generating an estimated phase error $\hat{\theta}$ according to the first operation result and the second operation result;

wherein, the estimated phase error $\hat{\theta}$ is associated with a Fourier series of $$\frac{\partial}{\partial \theta} \ln f(x, \theta),$$

and $f(x, \theta)$ represents a probability function of the input signal x, and
wherein the estimated phase error $\hat{\theta}$ is used to compensate a phase of the input signal x.

7. The phase error estimating method according to claim 6, before step (b), further comprising:
  adjusting a signal strength $\alpha^2$ of the input signal, where $\alpha$ represents a normalization factor;
  wherein, the normalization factor a is for generating the first harmonic coefficient $h_1(r)$ and the second harmonic coefficient $h_2(r)$.

8. The phase error estimating method according to claim 7, wherein step (b) comprises generating the first harmonic coefficient $h_1(r)$ according to an equation:

$$h_1(r) = \begin{cases} 0, & r < d_1\alpha \\ d_2 + \dfrac{d_3}{\alpha}(r - d_4\alpha), & r \geq d_5\alpha \\ \dfrac{d_6}{2\alpha}(r - d_7\alpha), & \text{else} \end{cases};$$

wherein, each of $d_1$ to $d_7$ represents a constant value.

9. The phase error estimating method according to claim 7, wherein step (b) comprises generating the second harmonic coefficient $h_2(r)$ according to an equation:

$$h_2(r) = \begin{cases} 0, & r < d_8\alpha \\ \dfrac{d_9}{\alpha}(r - d_{10}\alpha), & r \geq d_8\alpha \end{cases};$$

wherein, each of $d_8$ to $d_{10}$ represents a constant value.

10. The phase error estimating method according to claim 7, wherein step (e) comprises generating the estimated phase error $\hat{\theta}$ according to an equation:

$\hat{\theta} = h_1(r)\sin(M\theta) - h_2(r)\sin(2M\theta)$.

* * * * *